United States Patent [19]
Louvo

[11] Patent Number: 4,633,535
[45] Date of Patent: Jan. 6, 1987

[54] APPARATUS FOR TREATING BIOLOGICAL WASTE BY MEANS OF COMPOSTING

[76] Inventor: Jarmo Louvo, Kumputie 5 A, SF-45200 Kouvola, Finland

[21] Appl. No.: 758,219
[22] PCT Filed: Nov. 16, 1984
[86] PCT No.: PCT/FI84/00083
 § 371 Date: Jul. 2, 1985
 § 102(e) Date: Jul. 2, 1985
[87] PCT Pub. No.: WO85/02172
 PCT Pub. Date: May 23, 1985

[30] Foreign Application Priority Data
 Nov. 16, 1983 [FI] Finland .................................. 834191

[51] Int. Cl.⁴ ..................... A47K 11/02; A47K 11/00
[52] U.S. Cl. ..................... 4/449; 4/DIG. 12; 4/111.2; 4/111.5; 4/111.6; 71/9; 366/233; 422/209; 422/233
[58] Field of Search ................ 4/449, DIG. 12, 111.1, 4/111.2, 111.3, 111.4, 111.5–111.6; 422/209, 233, 193; 366/233, 228, 183; 71/8–9, 10; 210/620, 624, 630

[56] References Cited
U.S. PATENT DOCUMENTS

| | | | |
|---|---|---|---|
| 930,319 | 8/1909 | Short | 4/DIG. 12 |
| 3,054,663 | 9/1962 | Komline | 4/111.5 X |
| 3,921,228 | 11/1975 | Sundberg | 4/111.5 |
| 3,959,829 | 6/1976 | Novdgren | 4/111.2 |
| 4,213,864 | 7/1980 | Asikainen | 4/DIG. 12 |
| 4,254,515 | 3/1981 | Kiyama et al. | 4/111.1 X |
| 4,285,719 | 8/1981 | Criss | 4/449 X |
| 4,343,051 | 8/1982 | Parsson | 4/449 X |

FOREIGN PATENT DOCUMENTS

| | | | |
|---|---|---|---|
| 2253737 | 5/1973 | Fed. Rep. of Germany | 4/DIG. 12 |
| 03487 | 12/1981 | Sweden | 4/111.1 |

Primary Examiner—Henry K. Artis
Attorney, Agent, or Firm—McGlew and Tuttle

[57] ABSTRACT

Apparatus for treating waste, particularly household waste, by means of composting. The waste is collected in a generally known fashion into the collecting bowl (1), wherefrom they are immediately moved on the spiral conveyor (21) into the mixing drum (5), which is set into rotating motion by means of the actuator (12). Inside the mixing drum (5) there is arranged an amount of such medium substance which is formed of separate plastic or steel bullets, onto the surface whereof the waste sticks during mixing. In connection to the mixing drum (5) there is arranged the discharge space (9), which is provided with separator means (10) for separating the composted waste or soil. The compost soil is continuously moved out of the discharge space (9) and further into a bag or the equivalent. A partial feedback of the soil is arranged from the discharge space (9) back into the collecting bowl.

12 Claims, 4 Drawing Figures

APPARATUS FOR TREATING BIOLOGICAL WASTE BY MEANS OF COMPOSTING

FIELD AND BACKGROUND OF THE INVENTION

The present invention relates to a method for treating biological waste, particularly household waste, by means of composting.

The invention also relates to an apparatus, i.e. a dry latrine, mainly for treating biological household waste by means of composting, which latrine comprises a bowl for the waste, the bottom part of the bowl being preferably formed as a trough, wherein is installed a spiral conveyor or other similar conveyor and at the end of which trough is located an opening through which the waste is discharged into a separate space where the composting takes place.

Several dry latrines are known which utilize a particular medium substance or covering substance such as peat, sawdust or bark waste. Generally these latrines are operated on the principle that each person using the latrine covers his leavings. This feature also causes the drawbacks of the prior art latrines based on the use of covering substances. The spreading of the covering substance is both inconvenient and unhygienic. Automatically operated covering devices have also been developed, but generally their operation has not succeeded in the desired fashion.

On the other hand, many latrines with covering substance do not function satisfactorily although the dosing problem of the covering substance is solved. The composting process is very slow. This is due to the fact that optimal conditions for composting are usually not achieved in these latrines.

For instance the Finnish Patent Publication No. 52846 introduces a biological latrine based on the use of medium substance, which latrine comprises a U-shaped collecting vessel provided with perforations at the bottom, which vessel is located in a closed space. Lengthwise in the middle of the collecting vessel there are installed mechanical mixer means for treating the mass. These mixer means are formed of an axis geared to rotate horizontally, and the axis is provided with radially protruding shafts of different lengths, which shafts are all bent in the rotating direction of the axis.

Below the collecting vessel there is arranged a pullout container, whereto the compost soil processed in the collecting vessel can be dropped. In addition to this, the latrine is provided with a ventilation duct and a heating apparatus attached to the wall of the closed space.

The Finnish Patent Publication No. 54699 also introduces a biological latrine, where the composting chamber is realized as a U-shaped collecting bowl which is provided with similar mixer means as above. The chamber has a compact bottom and against the bottom there is installed an electric resistance foil which is protected by a heat insulator. The latrine can be provided with a thermostat placed within the chamber, and this thermostate regulates the heating resistor and prevents the temperature from rising too high with respect to the composting process. At the bottom of the chamber there is installed a moisture sensor which enables the regulation of the ventilation blower. In front of the composting chamber there is arranged a secondary chamber. Therebetween there is located a manually opened hatch through which the mass can be transferred from one chamber into the other.

In the medium substance latrines of the above patent publications, the purpose is to improve the composting conditions by means of the mixer means. However, these function ineffectively, and it seems probable that their use does not in practice lead to the desired result. For instance the discharge of the material from the composting chamber does not succeed by means of the described mixer means. The structure of the collecting vessel in these two examples does not ensure an effective aeration of the waste and the medium substance composition, even though the mixing should be improved. On the other hand it is pointed out that there is a trend to regulate the composting process by means of the thermostat and the moisture sensor.

The Finnish Patent Publication No. 63010 introduces a dry latrine where, at the bottom of the collecting vessel, there is arranged a trough whereinto a batch of the medium substance, for instance for two months, is charged all at the same time. The collecting vessel is provided with perforated end plates, and therebetween, at the bottom of the trough, there is placed the mixer spiral. The waste and the medium substance are mixed by means of the mixer spiral so that the mass is temporarily moved back and forth between the end plates, so that harmful process gases are exhausted and the mass is broken up into small lumps which are aerated effectively. Moreover, the process can be controlled by means of suitable sensors and a microprocessor, in which case the operation of the mixer, the ventilation, heat and moisture are accurately regulated. In addition to this there is located a discharge opening at the other end of the trough, through which opening the composted material can be discharged by means of the mixer spiral.

Irrespective of its several advantages, the above apparatus has two drawbacks. Firstly, the latrine must be regularly emptied and filled with the medium substance, although the operation periods are comparatively long. Secondly, the waste is treated and the waste is composted in the same space where it is put in the first place. In practice this is not a serious problem, but from the hygienic point of view it would be preferable if the composting proper should take place elsewhere. Generally speaking this applies for all the dry latrines described above.

SUMMARY OF THE INVENTION

The purpose of the present invention is to achieve a composting method and a dry latrine which allows for the avoidance of the drawbacks in the prior art dry latrines. In order to realize this, the method and the dry latrine of the invention are characterized by the novel features enlisted in the appended patent claims.

The advantages of the present invention can shortly be described as follows. After each use of the dry latrine, the waste is removed from the space functioning as the collecting vessel into the mixing drum where the composting proper takes place. Thus the hygienic conditions of the latrine are improved. The agitation and aeration of the waste is carried out effectively owing to the rotating mixing drum.

Small smooth-surfaced objects that are not composted along with the waste can be placed in one batch into the mixing drum. The purpose of these objects is to serve as the sticking surface for the waste so that a sufficient amount of air would be available for the microbes. By employing this arrangement, the repeated adding of medium substance batches can be avoided. The medium substance is separated from the composted matter, i.e. compost soil, in a separator device which is formed of the sieve placed above the discharge space.

The medium substance latrine of the invention is operated continuously, i.e. the recovered composted matter, the compost soil, is automatically transported out of the mixing drum through the outlet opening by means of the second conveyor. Moreover, by employing a return conveyor the composted matter can be fed back into the collecting vessel, i.e. into the same space where the first conveyor is installed at the bottom. Thus a preliminary mixing of the waste and the soil is carried out, and a microbe incubation takes place. Owing to the described operations, the composting process of the new waste gets an effective start. The presence of compost soil helps the first conveyor to keep clean, and the waste does not stick onto the conveyor surfaces.

In a simple embodiment of the invention, the described dry latrine can also be realized as a manually operated apparatus.

BRIEF DESCRIPTION OF THE DRAWING

In the following the invention is explained in detail with reference to the appended drawings, where.

DESCRIPTION OF THE PREFERRED EMBODIMENT

Figure 1:
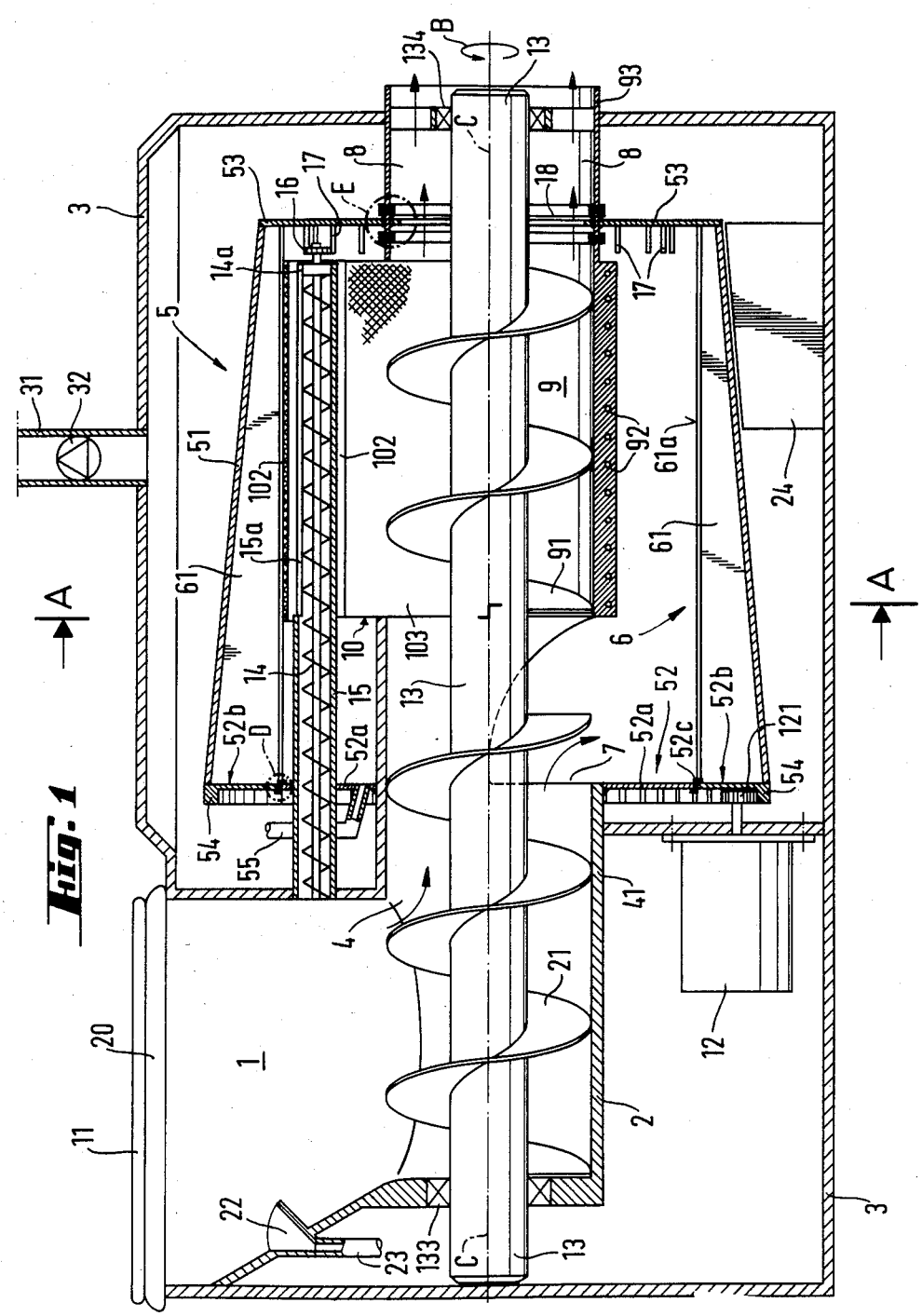
FIG. 1 is a partial cross-sectional view of a preferred embodiment of the dry latrine according to the invention.

The dry latrine comprises the collecting bowl, i.e. the space 1, whereto the waste is first collected. The collecting bowl is provided with the seat 20 and the lid 11. The bottom of the bowl forms the trough 2, which has a round bottom in cross-section, and the spiral or screw conveyor 21 is placed within the trough 2.

At the end of the trough, in the wall of the collecting bowl, there is the opening 4 through which the waste is transported out of the collecting bowl by means of the spiral conveyor 21 into a separate space where the composting proper takes place.

In the preferred embodiment according to FIG. 1, the opening 4 of the collecting bowl is connected with the pipe 41 to the separate mixing space, i.e. the mixing drum 5. The cross-section of the connecting pipe is such that the spiral conveyor 21 can be fitted therein. The spiral conveyor 21 reaches from the collecting bowl 1 as far as the mixing drum 5.

The mixing drum 5 comprises the casing 51 and the end plates 52, 53. Its form is preferably that of a truncated cone. The first end plate 52 is provided with the inlet opening 7 for feeding the waste, and the second plate 53 is provided with the outlet opening 8 for discharging the composted matter. The mixing drum 5 is preferably placed in horizontal position and connected to the actuator device 12, which is for instance an electric motor. By means of this actuator, the drum 5 can be rotated around its axis C—C.

Figure 2:
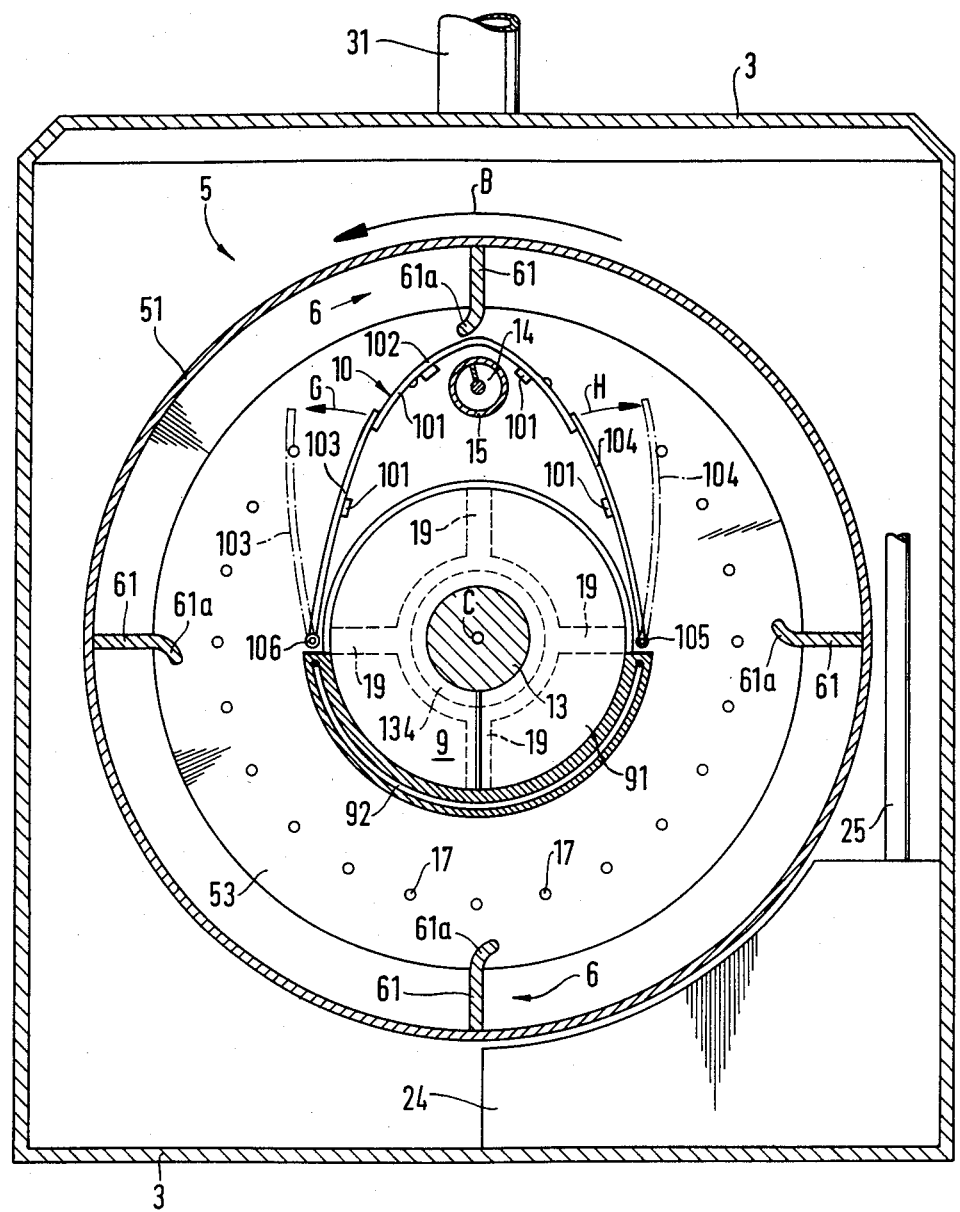
FIG. 2 shows the dry latrine of FIG. 1 in a cross-sectional view along the line A—A of FIG. 1.

On the inner wall of the mixing drum 51 there are attached the mixer means 6. The mixer means 6 are formed of the blades 61, which are nearly rectangular in shape. They are lengthwise fixed onto the inner wall of the casing 51 at short intervals from each other and in the same direction as the axis of the drum 5. In the embodiment of FIG. 2, the blades are positioned on the drum ring at 90° intervals. The free edges of the blades 61 are bent in the drum rotating direction B in order to improve the mixing.

Figure 3A:
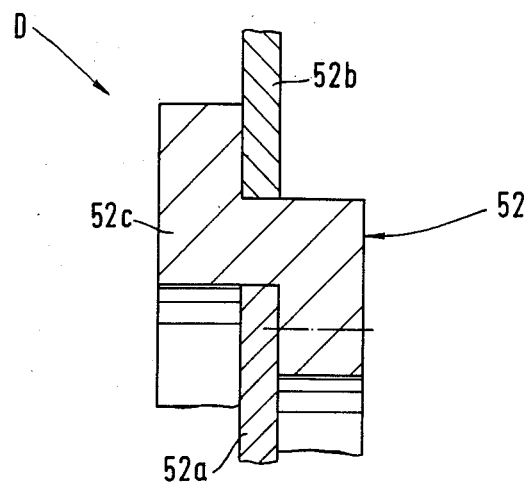
FIGS. 3A and 3B shows enlarged details of the dry latrine of FIG. 1.

The first end plate 52 of the mixing drum 5 comprises the round flange 52a, which is permanently fixed to the connecting pipe 41, and the annular flange 52b, which is permanently fixed to the casing 51 of the mixing drum. The round flange 52a and the annular flange 52b are fitted together and therebetween is placed the slide sealing 52c. FIG. 3A is an enlarged illustration of the area D of FIG. 1.

Within the mixing drum 5, in connection with the outlet opening 8, there is arranged the discharge space 9. This is formed by a trough which is open at the top, and above it there is installed the sieve 10 functioning as the separator means; it can also be a perforated plate or a wire net. The sieve 10 is preferably convex upwards, i.e. in the direction which is at right angles to the axis of the drum 5, as is seen in FIG. 2. The composted waste, i.e. compost soil, drops through the sieve 10 into the discharge space 9, whereas the non-composted lumpy waste slides along the surface back onto the bottom of the drum 5. The sieve 10 is advantageously provided with at least one electric resistor 101, which is used for heating the sieve. This prevents the blocking of the sieve holes. Damp waste or soil is dried on the sieve surface and falls either back into the mixing drum or into the discharge space 9.

It is advantageous that the discharge space 9 is provided with at least one electric resistor 92. This can be placed, as is seen in FIGS. 1 and 2, below the discharge space 9, so that it can be employed for heating both the discharge space and the mixing drum 5. This helps to evaporate the excessive dampness contained in the composted waste.

In the discharge space 9, which is constructed as a trough, there is fitted the second spiral or screw conveyor 91. Thereby the compost soil gathered in the discharge space 9 through the sieve 10 can be moved out of the mixing drum 5 through the outlet opening 8. At the outlet opening 8 for instance, a waste bag, a satchet or a suitable box can be arranged which is emptied from time to time or replaced by a new waste bag or equivalent.

The first and the second spiral conveyor, 21, 91, can be fitted on the same axis or shaft 13. In that case it is preferable that the spiral conveyors 21, 91 are placed within a uniform tubular member. This member forms the channel, i.e. the connection pipe 41, which is connected to the collecting bowl 1 or equivalent space and the mixer drum 5, as well as the discharge space 9 which is open at the top. In the tubular member, between the connection pipe 41 and the discharge space 9, there is also the inlet opening 7 for feeding the waste into the mixing drum 5. The continuation of the discharge space 9 is the outlet pipe 93. The axis 13 is supported by means of the bearings 133, 134 against the front of the collecting bowl 1 and against the back of the latrine frame 3 respectively. Around the bearing 134 there are openings through which the compost soil is discharged. The central axis C—C of the dry latrine extends through the axis 13.

Figure 3B:
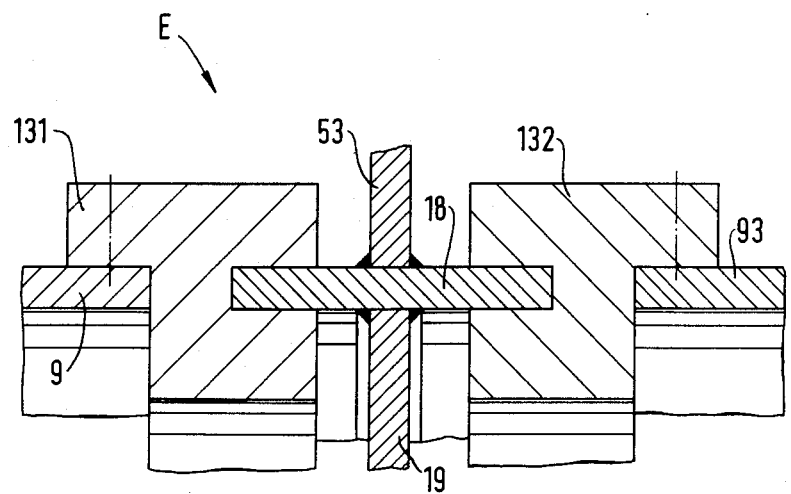

The first and second spiral conveyors 21, 91, and the mixing drum 5 are advantageously connected to the same actuator 12, which is for instance an electric motor. At the front edge of the annular flange 52b of the first end plate 52 of the mixing drum 5 there is installed the female tooth ring 54. On the axis of the actuator 12 there is installed the cog wheel 121, which is fitted to match the tooth ring 54. At the other end plate 53 of the mixing drum 5, in the middle of the end plate, there is the outlet opening 8. Into this opening is fitted the ring 18, which is on one hand fixed permanently to the axis 13 by means of the intermediary supports 19 and on the other hand to the end plate 53. The ring 18 is supported and shiftably connected, by means of the slide sealings 131, 132, to the trough-like discharge space 9 and to the discharge pipe 93 as is seen in FIG. 3B, which is an enlarged illustration of the area E of FIG. 1. According to this arrangement, while the mixing drum 5 is rotated by the actuator 12, the axis 13 and its spiral conveyors 21, 91 are rotated by intermediation of the ring 18 and the intermediate supports 19. It is noted that flange 52a of end plate 52 is fixed while flange 52b rotates.

Below the sieve 10 there is installed the third spiral conveyor, i.e. the return spiral or screw conveyor 14, which reaches through the stationary flange 52a up above the first spiral conveyor 21 into the space 1, where the waste is first collected. The return spiral conveyor 14 is placed in the pipe 15, which comprises either one uniform opening 15a or several openings below the sieve 10. The return spiral conveyor 14 is geared only at one end by the bearings 14a, while the other end rests free in the pipe 15. On the axis of the return spiral conveyor 14, which runs through the bearings 14a, there is fitted the star wheel or cog wheel 16. In the end plate 53 of the mixing drum 5 there is arranged a number of studs 17 at a suitable distance from the axis 13. The distance is chosen so that the studs fit into the notches of the star wheel 16 while the mixing drum rotates; thus the studs wind the star wheel and simultaneously the return spiral conveyor 14. The number of the studs 17 determines the rotating speed of the return spiral conveyor, and consequently the speed can be chosen as desired.

The sieve 10 or equivalent separator means is advantageously constructed so that it can at least partially be pulled away or turned aside from the top of the discharge space 9. Thus it is possible to empty the mixing drum 5 completely when so desired. The sieve 10 can be realized so that it comprises three parts: the top part 102 and the side parts 103 and 104 placed on both sides of the top part. The top part 102 is permanently fixed above the discharge space 9 and suitably supported against the discharge space, whereas the side parts 103 and 104 are provided with hinges at their bottom edges and attached to the edges of the discharge space 9. The side parts 103, 104 can be turned, suspended from the hinges 105, 106, aside from the bottom edge of the upper part 102, into positions G and H respectively, as is shown in FIG. 2.

A suitable medium substance, such as bark waste, sawdust or peat, can be added into the mixing drum. It is particularly advantageous if the medium substance is formed of relatively small objects, with a diameter between 5 and 15 mm, which objects have a surface as smooth and large as possible and preferably a ball-shaped form. They can be for instance plastic or steel bullets, which are not composted along with the waste. The waste sticks onto the surfaces of the medium substance objects and, as these objects have a surface as large as possible compared to their volume, there is a fair amount of air available for the microbes. The diameter of the holes in the sieve 10 functioning as the separator must naturally be chosen so that it is shorter than the diameter of the smallest medium substance object employed.

The collecting bowl, i.e. the space 1, the trough 2, the connection pipe 41, the mixing drum 5, the discharge space 9, the spiral conveyors 21, 91 and 14 and other connected devices are protected within the frame 3 of the dry latrine. The ventilation pipe 31, whereinto is installed the blower 32, is connected to the upper part of the frame 3. The air pipe 55 is directed through the stationary flange 52a of the mixing drum 5 and advantageously connected directly to the ventilation pipe 31. This guarantees a good ventilation for the mixing drum 5.

It is advantageous that a separate urine channel 22 is arranged within the collecting bowl. By means of this channel and the pipe 23 at least part of the urine is directed into the container 24. The container is connected to the ventilation pipe 31 by means of the pipe 25 (see FIG. 2). The container can be provided with an electric resistor (not illustrated in the drawings) whereby urine can be evaporated from the container 24.

The principles of operation of the dry latrine according to the invention are the following. After the dry latrine has been used, the leavings are moved, by means of the first spiral conveyor 21, from the collecting bowl, i.e. the space 1, into the mixing drum 5. The drum is rotated and its blades 61 mix the new waste into the material located at the front end of the drum, near the end plate 52, which material is composted of solid medium substance objects and composting waste. While the mixing drum 5 rotates further, the waste sticks in layers onto the surface of each medium substance object. In the mixing process the medium substance objects are separated from each other, and the material becomes homogenous. Thus aeration takes place effectively, and the composting process is quick. When the composition of medium substance objects and waste becomes homogenous, it also receives a finer structure and becomes lighter than the waste itself, wherefore it is easily moved towards the other end 53 of the mixing drum.

The blades 61 lift the composition onto the separation device located in connection with the discharge space 9, which separation device in this case is the sieve 10. The processed compost soil is separated into the discharge space 9 through the sieve 10, whereas the non-composted waste and the medium substance objects fall back into the mixing drum 5. The compost soil mainly falls onto the second spiral conveyor 91 located in the discharge space 9, whereby it can be continuously moved into a bag or equivalent located outside the dry latrine. Part of the soil is returned on the return spiral conveyor 14 back into the collecting bowl 1 below the seat 10. Fresh waste is thus mixed already at the shifting stage on the first spiral conveyor 21 into a small amount of soil. Thus the microbes that decompose waste are naturally and effectively brought into the fresh waste.

The dry latrine of the invention can be provided with one or several temperature and moisture sensors which are placed in the mixing drum 5. According to the messages received from these sensors, the heating resistors 92, 101 can be connected to the power source and/or the ventilation can be regulated by means of the blower and/or the mixing can be regulated by means of the actuator 12. Thus optimal composting conditions can be maintained within the mixing drum 5.

In the preferred embodiment of the invention described above, spiral conveyors are used for moving the waste and the composted matter. They can be replaced by other types of suitable prior art conveyors, such as belt conveyors. The power transmission from the actuator to the mixing drum can be realized by means of a cone belt or a cogged belt. The rotating mechanism of the return spiral conveyor can also be realized in similar manner, or a tooth ring can be used instead of the studs 17. The mixer means 6 located on the inner surface of the casing 51 of the mixing drum 5 can also have a different form than that of the above example. The essential feature of the mixer means is that they can also be employed for lifting the composition of waste and medium substance on top of the sieve 10.

As regards the continuous, uninterrupted operation of the dry latrine, the separation means, such as the sieve 10 or equivalent, is of primary importance. In order to keep the holes of the sieve 10 open, there can be installed, in addition to or instead of the electric resistors 101, also a vibrator which temporarily sets the sieve into a vibrating motion. In connection to the sieve 10 there can also be arranged a water pipe provided with holes at short intervals from each other; this water pipe is connected to the water supply line with a valve, for instance an electrically controlled magnet valve. The sieve can be cleaned every once in a while by the water sprays spouting from the pipe holes.

The sieve 10 can also have a form other than that illustrated in the drawings. It can be for instance triangular in cross-section. It is advantageous that the sieve 10 or parts of it such as the perforated plate, net or equivalent, are placed at a relatively sharp angle with respect to the horizontal level so that the fine matter, i.e. the soil, can freely drop into the discharge space 9 through the sieve holes, and so that the still lumpy and only partly composted waste and the medium substance there along slide or roll, due to gravitation, along the sieve surface over the edge of the discharge space 9, and fall back into the mixing drum 5. Generally speaking the essential feature of the separator means is the fact that the processed compost soil can thereby be separated from the waste, which is returned into the composting process. On the axis of the first spiral conveyor, in front of the collecting bowl, there can be installed a manual lever whereby the mixing drum can be rotated in case the actuator 12 is out of operation or in case the dry latrine is constructed so that it does not use external energy.

The dry latrine of the invention also gives the possibility for building larger latrine units. In that case for instance the waste can be moved, on the first spiral conveyors or equivalent, from several collecting bowls onto a collecting conveyor placed transversally with respect to the first conveyors, and the collecting conveyor transports the waste into a common mixing drum. This common mixing drum is larger in size than the above described drum, but otherwise similar in structure.

I claim:

1. A dry latrine for treating biological household waste by means of composting, which latrine comprises a space (1) for collecting the waste, the bottom of which space is formed as a trough (2), into which trough is fitted a conveyor (21), and at the end of said trough there is located an opening (4), through which the waste is moved out of the trough into a separate space where the composting takes place, characterized in that the separate space is formed of a mixing drum (5), which is placed in horizontal position and at the first end (52) whereof there is located an inlet opening (7), and that on an inner wall (51) of the mixing drum (5) there are attached mixer means (6), and that the mixing drum (5) is connected to an actuator (12) whereby the mixing drum (5) is rotated around its axis, and that there is an outlet opening (8) at the other end (53) of the mixing drum (5).

2. The dry latrine of claim 1, characterized in that the mixer means (6) are formed of blades (61) which are attached in lengthwise position onto the inner wall of the mixing drum (5) at intervals from each other in the direction of rotation of the drum.

3. The dry latrine of claim 1 or 2, characterized in that within the mixing drum (5) there is a discharge space (9) containing the outlet opening (8), and that above the discharge space (9) there is placed separator means (10) through which the composted waste drops into the discharge space (9).

4. The dry latrine of claim 3, characterized in that within the discharge space (9) there is fitted a second conveyor (91) so that, whereby the material collected in the discharge space (9) can be moved out of the mixing drum (5) through the outlet opening (8).

5. The dry latrine of claim 3, characterized in that below the separator means (10) there is placed a return conveyor (14), which is fitted within a pipe (15), which pipe is at least partially open at the top and reaches up above the first mentioned conveyor (21) into the space (1) where the waste is first collected.

6. The dry latrine of claim 1, characterized in that within the mixing drum (5) there is arranged an amount of medium substance, which medium substance is formed of smooth, round objects.

7. A dry latrine for treating biological waste comprising a collecting bowl defining a collecting space and having a trough at the bottom of said collecting space and an opening, a first conveyor movable in said trough for conveying waste from said collecting space through said opening, a mixing drum mounted for rotation about a horizontal axis and having an inlet opening communicating with said opening of said trough for receiving waste from said collecting space, mixer means connected in said mixing drum for mixing waste with a medium substance in said drum with rotation of said drum, said drum having an outlet opening therein on an opposite side thereof from said inlet opening, means defining a discharge space in said mixing drum communicating with said outlet opening, separator sieve means over said discharge space in said drum for receiving a composition of waste mixed with medium substance in said drum which is dropped on said sieve means with rotation of said drum for separating waste which falls into said discharge space from medium substance which falls off of said sieve means back into said drum, a second conveyor movable in said discharge space for moving separated waste to said outlet opening, and drive means connected to said drum and said first and second conveyors for rotating said drum and for moving said first and second conveyors.

8. A dry latrine according to claim 7, including a third conveyor movable in said discharge space above said second conveyor and below said sieve means, said third conveyor extending through an upper portion of said drum over a portion of said first conveyor and into said collecting space, said drive means being connected to said third conveyor for moving said third conveyor to convey a portion of the separated waste from said sieve means back to said collecting space.

9. A dry latrine according to claim 8, wherein said mixing drum is conical with a larger diameter adjacent said inlet opening and a smaller diameter adjacent said outlet opening, said means defining said discharge space being spaced away from said inlet opening, said mixer means comprising axially extending blades connected to an inner wall of said mixing drum.

10. A dry latrine according to claim 16, wherein said first and second conveyors comprise a single shaft rotatably mounted with respect to said collecting bowl and extending through said trough, through said drum and through said discharge space, a first screw conveyor portion on said shaft in said trough and extending through said inlet opening and a second screw conveyor portion on said shaft extending in said discharge space, said first and second screw conveyor portions being spaced from each other.

11. A dry latrine according to claim 10, wherein said sieve means comprises an upwardly concave sieve fixed above said discharge space and movable sieve portions at sides of said fixed sieve which are openable to expose said discharge space and closeable to close said discharge space.

12. A dry latrine according to claim 11, including urine separating means including an inlet channel connected to said collecting bowl at a location to receive urine, and a urine container connected to said channel.

* * * * *